US007904375B1

(12) United States Patent
Inzerillo

(10) Patent No.: US 7,904,375 B1
(45) Date of Patent: Mar. 8, 2011

(54) METHOD OF REGISTERING MULTIPLE FINANCIAL PRODUCTS WITH A SINGLE PROSPECTUS

(75) Inventor: Joseph A. Inzerillo, Syosset, NY (US)

(73) Assignee: Barclays Bank PLC, London (GB)

( * ) Notice: Subject to any disclaimer, the term of this patent is extended or adjusted under 35 U.S.C. 154(b) by 83 days.

(21) Appl. No.: 11/588,536

(22) Filed: Oct. 27, 2006

(51) Int. Cl.
*G06Q 40/00* (2006.01)
(52) U.S. Cl. .......................... 705/37; 705/35
(58) Field of Classification Search ................ 705/35, 705/37
See application file for complete search history.

(56) References Cited

U.S. PATENT DOCUMENTS

| | | | |
|---|---|---|---|
| 2002/0091621 A1* | 7/2002 | Conklin et al. | 705/37 |
| 2002/0161683 A1* | 10/2002 | Ginsberg | 705/36 |
| 2004/0039972 A1* | 2/2004 | Chung | 714/100 |
| 2006/0282356 A1* | 12/2006 | Andres et al. | 705/35 |

OTHER PUBLICATIONS

SEC Adopts Final Rules for Asset-Backed Securities; circa 2005, Jones Day; found on proquest.org.*
Frank J. Babozzi, "The Handbook of Mortgage-Backed Securities," Sixth Edition, 2006—material cited—"Bank of America Prospectus Supplement," dated 2005, also available at http://www.sec.gov, CIK 0001315171.*
Ramon Gomez, "A Practical Approach to Securities Offering Reform," ABA Bank Compliance, Jul./Aug. 2006, vol. 27, Iss. 4.*
Securities and Exchange Commission, "Secutiries Offering Reform; Final Rule," Aug. 3, 2005, Federal Register, vol. 70, No. 148, pp. 44721-44831.*
Jesse M. Brill, Comments of Jesse M. Brill, Concord, Calif., Mar. 3, 1997 http://www.sec.gov/rules/proposed/s7797.shtml, pp. 1-9.*
McDermott Will & Emery, "Securities Offering Reform," Sep. 2005, pp. 1-36.*
Barclays Bank PLC, Prospectus Supplement to Prospectus dated Sep. 21, 2005.
Barclays Bank PLC, Product Supplement dated Oct. 12, 2008.
Barclays Bank PLC, Free Writing Prospectus dated Oct. 12, 2006.
Barclays Bank PLC, Recon Product Supplement dated Jun. 7, 2008.
Barclays Bank PLC, Pricing Supplement to the Product Supplement dated Jun. 7, 2008.
Barclays Bank PLC, Preliminary Pricing Supplement dated Oct. 18, 2006.
Barclays Bank PLC, Prospectus Supplement dated Oct. 2006.
Barclays Bank PLC, Product Supplement to the Prospectus Supplement dated 2006.
Barclays Bank PLC, Term Sheet, undated.
Clearly Gottliegh Steen & Hamilton LLP, SEC Adopts Securities Offering Reform, dated Aug. 1, 2005.
Clearly Gottliegh Steen & Hamilton LLP, Securites Offering Reform Questions and Answers, dated Nov. 30, 2005.
Pillsbury Winthrop Shaw Pittman; Practical Lessons Learned From the First 100 Days of Securities Offering Reform, dated Mar. 10, 2006, vol. 0804, No. 8050, by Todd W. Ecklan, Stanton D. Wong, Jeffrey J. Delaney, David S. Baxter.

* cited by examiner

*Primary Examiner* — Jagdish N Patel
*Assistant Examiner* — Kenneth Bartley
(74) *Attorney, Agent, or Firm* — Amster, Rothstein & Ebenstein LLP

(57) ABSTRACT

A method of registering a note with a governmental authority including filing a prospectus supplement including detailed descriptions of a plurality of asset classes and a plurality of transaction structures and incorporating by reference a base prospectus, wherein the base prospectus includes an identification of one or more types of securities available from an issuer of the note and characteristics of the issuer.

22 Claims, 5 Drawing Sheets

METHOD OF REGISTERING MULTIPLE FINANCIAL PRODUCTS WITH A SINGLE PROSPECTUS

TECHNICAL FIELD

The present invention is generally related to a method for registering a financial product with a governmental authority, and in particular to a method for registering multiple products using a single prospectus.

BACKGROUND

When offering a new security, such as a note tied to a particular asset or assets which act as a benchmark, issuers are typically required to register the security with a governmental authority. FIG. 1 is a tree diagram, generally designated by reference number 100, showing a conventional method of registering a security using a shelf registration statement. The issuer first files a base prospectus 110 with the governmental authority, which sets forth general information regarding the issuer and types of securities available from the issuer. Once authorized by the governmental authority (automatically or otherwise), the registration statement establishes a "shelf" for the issuer, from which the issuer can then issue financial products to be offered to potential investors. In this regard, to register a particular product using a shelf, the issuer must file at least a prospectus supplement that sets forth detailed information for securities in a particular asset class that relates to the product. Thus, if the issuer desires to register a plurality of products, where each product relates to a different asset class, the issuer would typically file a prospectus supplement for each of the different asset classes, e.g., capital securities, common stock, depositary shares, guarantees, notes, preferred stocks, purchase contracts, rights, trust certificates, units or warrants, to name a few. For example, in FIG. 1, prospectus supplements 120, 130 and 140 are filed, where each prospectus supplement 120, 130, 140 relates to a different asset class or different transaction structure. The issuer may then file product supplements based on each of the prospectus supplements that disclose further details regarding the offered security beyond the information related to the asset class or transaction structure. For example, product supplements 120-1A, 120-2A and 120-3A may be filed based on prospectus supplement 120, product supplements 130-1A and 130-2A may be filed based on prospectus supplement 130, and product supplements 140-1A, 140-2A, 140-3A and 140-4A may be filed based on prospectus supplement 140. In addition, each product supplement typically in practice has a pricing supplement, such as pricing supplements 120-1B, 120-2B and 120-3B corresponding to product supplements 120-1A, 120-2A and 120-3A, respectively, pricing supplements 130-1B and 130-2B corresponding to product supplements 130-1A and 130-2A, respectively, and pricing supplements 140-1B, 140-2B, 140-3B and 140-4B corresponding to product supplements 140-1A, 140-2A, 140-3A and 140-4A, respectively. The pricing supplements set forth the specific terms of the offered securities.

In sum, a particular product offered to a customer of an issuer would typically have a pricing supplement, e.g., 140-1B, which incorporates by reference the corresponding product supplement, e.g., 140-1A, the corresponding prospectus supplement, e.g., 140, and the underlying base prospectus, e.g., 110. In the prior art, the number of prospectus supplements that the issuer files typically depends on the number of asset classes or transaction structures represented by the plurality of offered products, and the number of product supplements and pricing supplements that the issuer files depends on the number of products the issuer is offering. Thus, when offering a plurality of products based on shelf prospectus, the issuer in the past has typically filed numerous detailed prospectus supplements in order to satisfy the disclosure requirements of a governmental authority. Since these prospectuses are typically large documents including much information, the need for such large quantities of different prospectuses leads to high printing costs for the issuer and prevents potential investors from obtaining a quick understanding of offered products by reviewing the prospectuses. Also, the large amount of material typically included in the pricing supplements increases the time it takes to prepare the necessary paperwork to launch a new financial product, such as a note, and increases the likelihood of errors in disclosure.

Accordingly, there is a need for a method for registering multiple financial products that requires a reduced amount of prospectus filings and printed information provided in at least some of the filed prospectuses, and that allows potential investors to quickly obtain material information regarding the financial products.

SUMMARY OF THE INVENTION

A method of registering a note with a governmental authority according to an exemplary embodiment of the present invention comprises filing a prospectus supplement including detailed descriptions of a plurality of asset classes and a plurality of transaction structures and incorporating by reference a base prospectus, wherein the base prospectus includes an identification of one or more types of securities available from an issuer of the note and characteristics of the issuer.

In at least one embodiment, the method further comprises filing a pricing supplement including material economic business terms for the note and incorporating by reference the prospectus supplement including a description of one or more reference assets.

In at least one embodiment, the material economic business terms comprise one or more of the following: asset class, trade date, issue date, valuation date, maturity date, upside payoff structure, downside payoff structure, upside leverage factor, downside leverage factor, underlying reference asset relating to a coupon, underlying reference asset relating to principal, formula for determining payment at maturity, maximum maturity payment, initial reference asset level or final reference asset level.

In at least one embodiment, the base prospectus further comprises a list of all entities issuing the one or more securities and all entities guaranteeing the one or more securities.

In at least one embodiment, the method further comprises the step of offering the note.

In at least one embodiment, the method further comprises filing a free writing prospectus which incorporates by reference the prospectus supplement.

In at least one embodiment, the note is a senior note.

In at least one embodiment, the note is a subordinated note.

In at least one embodiment, the one or more types of securities comprise one or more of the following: capital securities, certificates, common stock, depositary shares, guarantees, notes, preferred stock, purchase contracts, rights, trust certificates, units or warrants.

In at least one embodiment, the characteristics of the issuer comprise one or more of the following: name, address, state of incorporation, note rating or business description.

In at least one embodiment, the plurality of transaction structures comprise one or more of the following: principal protected structure, barrier structure, buffer structure, call and put features linked to milestones, leverage or caps.

A method of registering a note with a governmental authority according to another exemplary embodiment of the present invention comprises filing a prospectus including detailed descriptions of a plurality of asset classes and a plurality of transaction structures, an identification of one or more types of securities available by an issuer of the note and characteristics of the issuer.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

In the method of registering multiple financial products according to various exemplary embodiments of the present invention, a supplemental prospectus is filed which includes detailed information on a plurality of asset classes and structures. Thus, a plurality of pricing supplements relating to a plurality of offered products may be generated based on the supplemental prospectus, even if each one of the products is associated with a different type of asset class and structure. Further, since the supplemental prospectus includes detailed information besides rates in a particular asset class, and the pricing supplements incorporate the supplemental prospectus by reference, the pricing supplements need not be as bulky. Thus, the pricing supplements can be easily read and understood by a potential investor, be prepared in less time and is less likely to contain any transcription errors.

Figure 1:
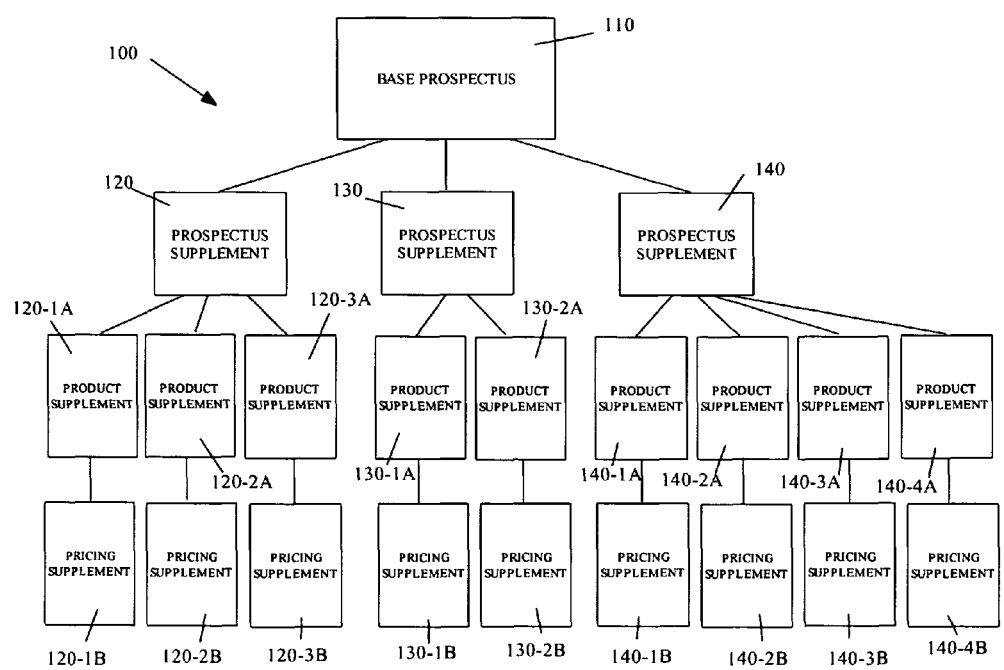
FIG. 1 is a tree diagram illustrating a conventional method for registering multiple financial products using a shelf.
Figure 2:
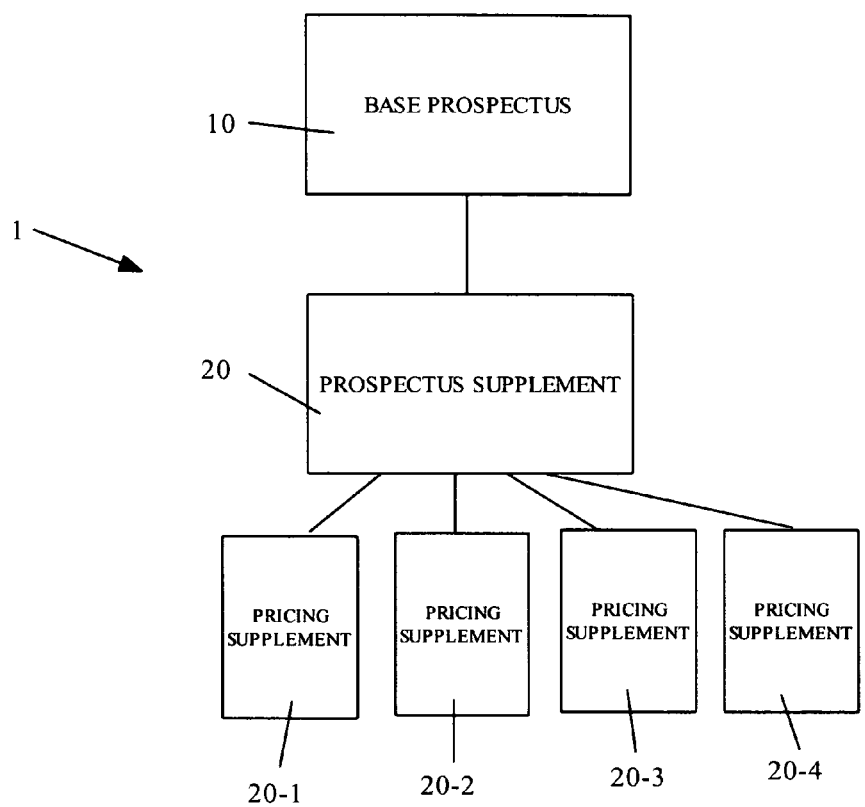
FIG. 2 is a tree diagram illustrating a method of registering multiple financial products with a single prospectus according to an exemplary embodiment of the invention.

FIG. 2 is a tree diagram, generally designated by reference number 1, that illustrates a method of registering multiple financial products, such as notes, with a single prospectus filed with a governmental authority according to an exemplary embodiment of the present invention. If the financial product is a note, the note may be a senior note or a subordinated note. Subordinated notes may include senior subordinated notes. As shown in FIG. 2, a base prospectus 10 may be filed for the purpose of complying with the disclosure requirements to get a shelf registration statement declared effective by a governmental authority, such as the U.S. Securities and Exchange Commission (SEC). In general, filings with the SEC are electronic filings. The base prospectus 10 may include general information regarding the issuer of the financial products, such as the types of securities offered by the issuer, a brief summary of the issuer, such as name, address, state of incorporation, note rating and business description of the issuer. The types of securities for which general information is provided in the base prospectus 10 may include, for example, capital securities, certificates, common stock, depositary shares, guarantees, notes, preferred stock, purchase contracts, rights, trust certificates and warrants. For each security, the base prospectus 10 may also include a list of issuing entities and guaranteeing entities, if there is more than one entity involved. When guaranteeing entities are disclosed, a brief summary of each guarantor may also be included, such as name, address, state of incorporation, note rating and business description of the guarantor.

Typically, a registration statement will need to be approved by one or more government authorities, which can be a time-consuming process. However, for some entities, such as well-known seasoned issuers (WKSIs), this approval may be automatic, but subject to potential review by the governmental authority.

A prospectus supplement 20 may also be filed that incorporates by reference the base prospectus 10. Thus, the prospectus supplement 20 includes the information provided in the base prospectus 10, without necessarily duplicating the language from the base prospectus 10. The prospectus supplement 20 may include detailed descriptions of a plurality of asset classes such as, for example, equity, commodities, rates, currency, real estate and miscellaneous (e.g., hedge funds, private equity, to name a few). The prospectus supplement 20 may also include a detailed description of a plurality of financial product structures, such as, for example, principal protected structure, barrier structure, buffer structure, call and put features linked to milestones, upside and downside leverage and caps, to name a few, as well as risk factors associated with each such financial product structure.

Pricing supplements 20-1, 20-2 and 20-3 may also be filed, where each pricing supplement 20-1, 20-2, 20-3 corresponds to a respective one of a plurality of offered products. The pricing supplements 20-1, 20-2, 20-3 incorporate by reference the prospective supplement 20. Thus, since the prospective supplement 20 already includes detailed descriptions of structure and asset class, the pricing supplements 20-1, 20-2, 20-3 need not duplicate the same information, and only material economic terms without the detailed explanation of such material economic terms which is already presented in the prospectus supplement, need to be presented in the pricing supplements 20-1, 20-2, 20-3. For example, the pricing supplements 20-1, 20-2, 20-3 may only include material economic terms, such as, for example, asset class, trade date, issue date, valuation date, maturity date, upside payoff structure, downside payoff structure, upside leverage factor, downside leverage factor, underlying reference asset relating to a coupon, underlying reference asset relating to principal, formula for determining payment at maturity, maximum maturity payment, initial reference asset level and final reference asset level. Once the necessary prospectuses are filed, the note is offered to a potential investor, who can then review the material financial terms in the pricing supplements 20-1, 20-2, 20-3.

Figure 3:
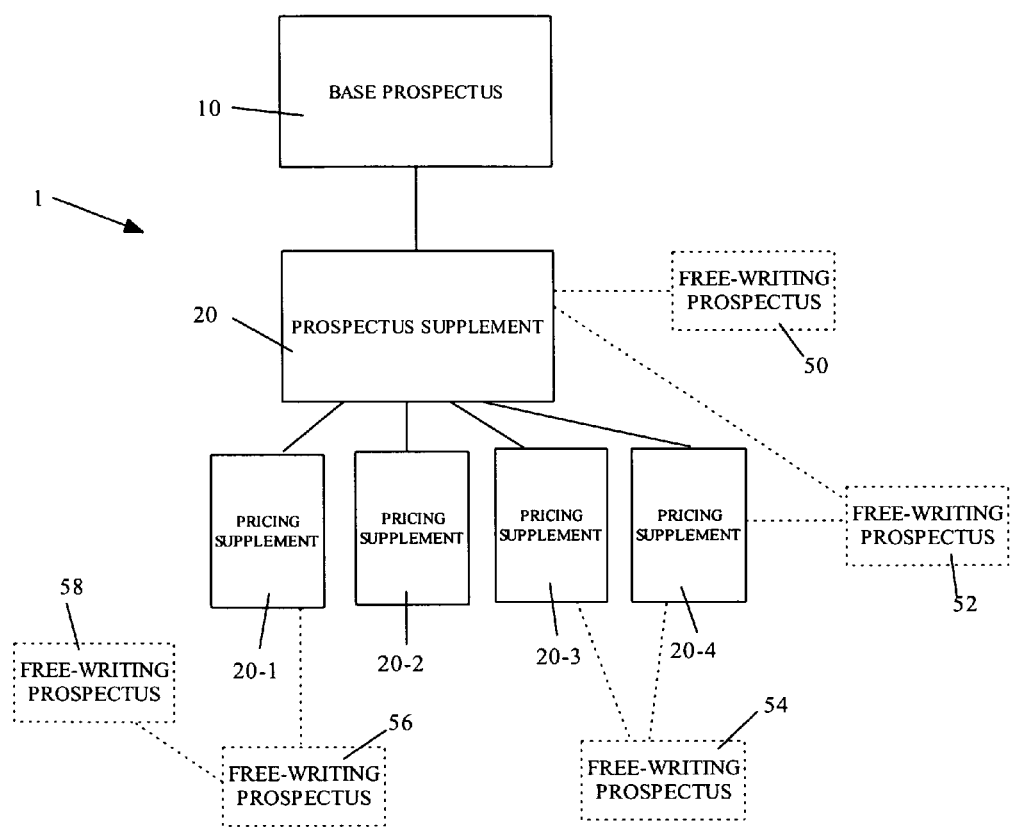
FIG. 3 is a tree diagram illustrating a method of registering multiple financial products with a prospectus according to another exemplary embodiment of the invention.

In embodiments of the present invention, the issuer may also file free writing prospectuses, which may be, for example, written sales literature relating to an offering of a security that is made outside a base prospectus or prospectus supplement meeting the requirements of the governmental authority. The free writing prospectus may incorporate by reference other free writing prospectuses, prospectus supplements, pricing supplements or prospectuses, so that the free writing prospectus may include all the information included in the other filed documents. For example, as shown in FIG. 3, multiple free writing supplements 50, 52, 54, 56 and 58 may be filed, where each free writing supplement 50-58 can incorporate by reference any variety of filed documents. Other filings may also incorporate by reference one or more free writing prospectuses.

Figure 4:
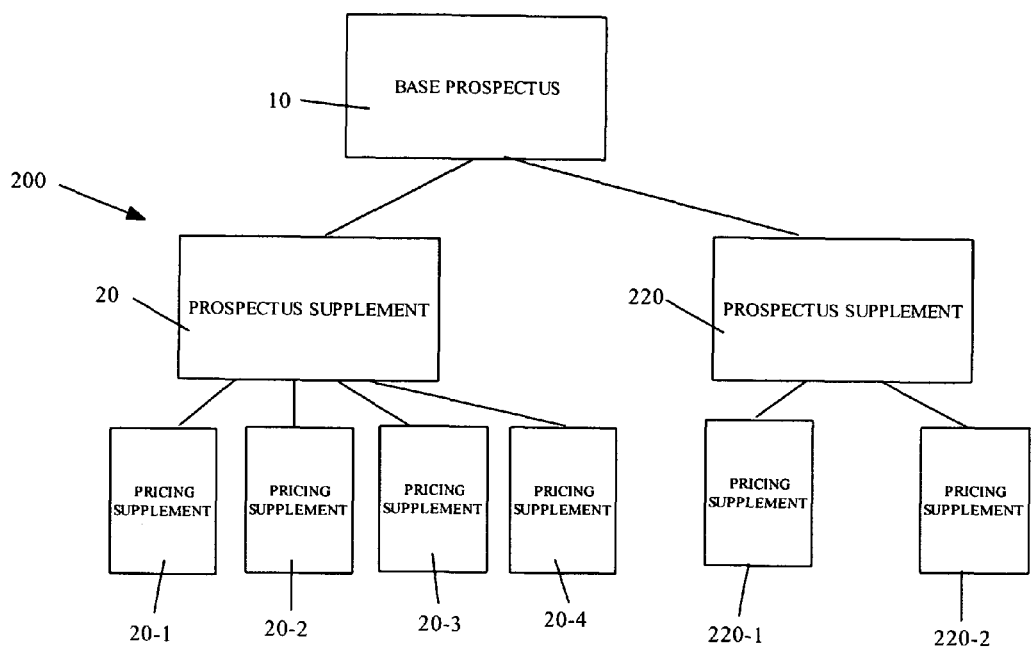
FIG. 4 is a tree diagram illustrating a method of registering multiple financial products with a prospectus according to another exemplary embodiment of the invention.

FIG. 4 is a tree-diagram, generally designated by reference number 200, that illustrates a method of registering multiple financial products, such as notes, with a prospectus filed with a governmental authority according to another exemplary embodiment of the present invention. The registering procedure in this embodiment is generally the same as that described in the previous embodiments, except that additional prospectus supplements are filed. For example, as shown in FIG. 4, prospectus supplement 220 is filed in addition to the prospectus supplement 20. The prospectus supplement 220 incorporates the base prospectus 10 by reference and may include detailed descriptions of one or more asset classes and one or more financial product structures that are not included in the prospectus supplement 20. In addition, pricing supplements 220-1 and 220-2, for example, may be filed that incorporate the prospectus supplement 220 and base prospectus 10 by reference. The number of pricing supplements filed depends upon the number of different notes being offered. Typically, each note will have its own pricing supplement, which in turn incorporates by reference the corresponding prospectus supplement and base prospectus. Alternatively, multiple notes could use the same free writing prospectus or pricing supplement, which in turn incorporates by reference the corresponding prospectus supplement and base prospectus.

Figure 5:
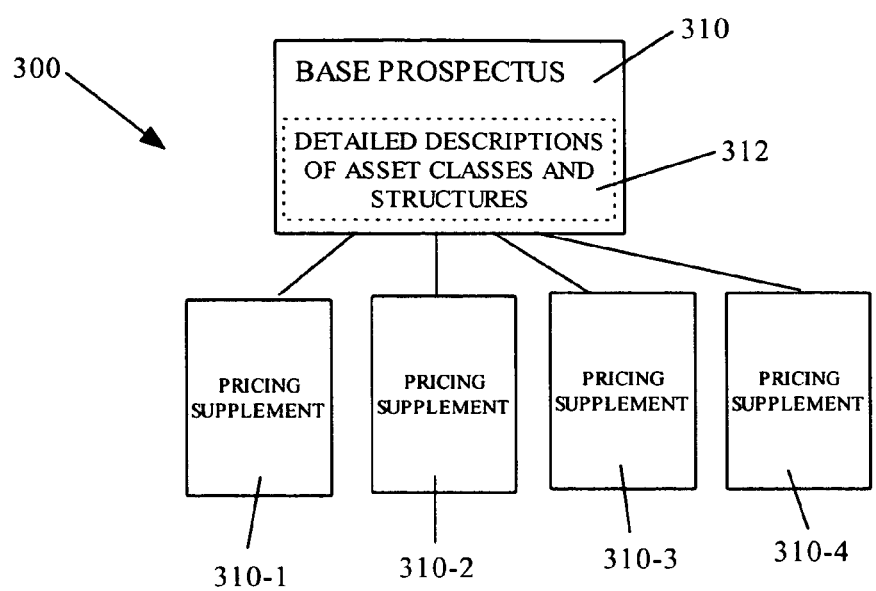
FIG. 5 is a tree diagram illustrating a method of registering multiple financial products with a prospectus according to another exemplary embodiment of the invention.

FIG. 5 is a tree-diagram, generally designated by reference number 300, that illustrates a method of registering multiple financial products, such as notes, with a prospectus filed with a governmental authority according to another exemplary embodiment of the present invention. The registering procedure in this embodiment is generally the same as that described in the previous embodiments, except that in this case the issuer is a WKSI, and thus, since effectiveness of the registration statement is automatic, detailed information that is typically provided in the prospectus supplement may be incorporated into the base prospectus. For example, as shown in FIG. 5, base prospectus 310 includes detailed descriptions 312 of a plurality of asset classes and a plurality of financial product structures. One or more pricing supplements 310-1, 310-2 and 310-3 may be filed based on the base prospectus 310, each including only the material economic terms of a corresponding offered product.

Now that the preferred embodiments have been shown and described in detail, various modifications and improvements thereon will be readily apparent to those skilled in the art. Accordingly, the spirit and scope of the present invention is to be construed broadly and be limited only by the appended claims, and not by the foregoing specification.

What is claimed is:

1. A method comprising:
   electronically filing by one or more computer systems with the U.S. Securities and Exchange Commission, a first electronic document in a form of a base prospectus, the first electronic document comprising data identifying one or more types of securities available from an issuer of a note and characteristics of the issuer;
   selecting data regarding detailed descriptions of at least two different asset classes and data regarding a plurality of transaction structures;
   generating by one or more computer systems a second electronic document in a form of a supplemental prospectus, the second electronic document comprising the selected data regarding detailed descriptions of at least two different asset classes, and further comprising the data regarding a plurality of transaction structures and data incorporating by reference the first electronic document; and
   electronically filing by one or more computer systems the second electronic document with the U.S. Securities and Exchange Commission.

2. The method of claim 1, further comprising electronically filing by one or more computer systems a third electronic document with the U.S. Securities and Exchange Commission in a form of a pricing supplement comprising data regarding material economic business terms for the note and data incorporating by reference the second electronic document.

3. The method of claim 2, wherein the material economic business terms include one or more of the following: asset class, trade date, issue date, valuation date, maturity date, upside payoff structure, downside payoff structure, upside leverage factor, downside leverage factor, underlying reference asset relating to a coupon, underlying reference asset relating to principal, formula for determining payment at maturity, maximum maturity payment, initial reference asset level or final reference asset level.

4. The method of claim 2, further comprising the step of offering the note.

5. The method of claim 1, wherein the first electronic document further comprises data regarding a list of all entities issuing the one or more securities and data regarding all entities guaranteeing the one or more securities.

6. The method of claim 1, further comprising electronically filing by one or more computer systems a third electronic document with the U.S. Securities and Exchange Commission in a form of a free writing prospectus which incorporates by reference the second electronic document.

7. The method of claim 1, wherein the note is a senior note.

8. The method of claim 1, wherein the note is a subordinated note.

9. The method of claim 1, wherein the one or more types of securities comprise one or more of the following: capital securities, certificates, common stock, depositary shares, guarantees, notes, preferred stock, purchase contracts, rights, trust certificates, units or warrants.

10. The method of claim 1, wherein the characteristics of the issuer include one or more of the following: name, address, state of incorporation, note rating or business description.

11. The method of claim 1, wherein the plurality of structures comprise one or more of the following: principal protected structure, barrier structure, buffer structure, call and put features linked to milestones, upside and downside leverage or caps.

12. A method comprising:
   selecting securities type identifying at least one of one or more types of securities available from an issuer of a note;
   generating by one or more computer systems a first electronic document in a form of a prospectus, the first electronic document comprising data regarding the selected securities type data and detailed descriptions of at least two different asset classes, and further comprising data regarding a plurality of transaction structures, an identification of one or more types of securities available by an issuer of the note, and characteristics of the issuer, wherein the prospectus is a prospectus supplement, and the identification and the characteristics are incorporated by reference from a base prospectus; and electronically filing by one or more computer systems the first electronic document with the U.S. Securities and Exchange Commission.

13. The method of claim 12, further comprising electronically filing by one or more computer systems a second electronic document with the U.S. Securities and Exchange Commission in a form of a pricing supplement comprising data regarding material economic business terms for the note and data regarding incorporating by reference the prospectus supplement including a description of one or more reference assets.

14. The method of claim 13, wherein the material economic business terms include one or more of the following: asset class, trade date, issue date, valuation date, maturity date, upside payoff structure, downside payoff structure, upside leverage factor, downside leverage factor, underlying reference asset relating to a coupon, underlying reference asset relating to principal, formula for determining payment at maturity, maximum maturity payment, initial reference asset level or final reference asset level.

15. The method of claim 12, wherein the base prospectus further comprises a list of all entities issuing the one or more securities and all entities guaranteeing the one or more securities.

16. The method of claim 12, further comprising the step of offering the note.

17. The method of claim 12, further comprising filing by one or more computer systems a second electronic document with the U.S. Securities and Exchange Commission in a form of a free writing prospectus which incorporates by reference the prospectus supplement.

18. The method of claim 12, wherein the note is a senior note.

19. The method of claim 12, wherein the note is a subordinated note.

20. The method of claim 12, wherein the one or more types of securities comprise one or more of the following: capital securities, certificates, common stock, depositary shares, guarantees, notes, preferred stock, purchase contracts, rights, trust certificates, units or warrants.

21. The method of claim 12, wherein the characteristics of the issuer include one or more of the following: name, address, state of incorporation, note rating or business description.

22. The method of claim 12, wherein the plurality of transaction structures comprise one or more of the following: principal protected structure, barrier structure, buffer structure, call and put features linked to milestones, leverage or caps.

* * * * *